O. T. GRONNER.
Sawing-Machine.

No. 165,325.

Patented July 6, 1875.

WITNESSES:
A. B. Robertson
Colon C. Kenion

INVENTOR:
Ole T. Gronner
BY
ATTORNEYS.

UNITED STATES PATENT OFFICE.

OLE T. GRONNER, OF BALTIMORE, MARYLAND.

IMPROVEMENT IN SAWING-MACHINES.

Specification forming part of Letters Patent No. 165,325, dated July 6, 1875; application filed March 12, 1875.

*To all whom it may concern:*

Be it known that I, OLE T. GRONNER, of Baltimore city, State of Maryland, have invented a new and useful Improvement in Sawing-Machines; and I do hereby declare that the following is a full, clear, and exact description of the same, reference being had to the accompanying drawing, forming a part of this specification, in which—

Figure 1:
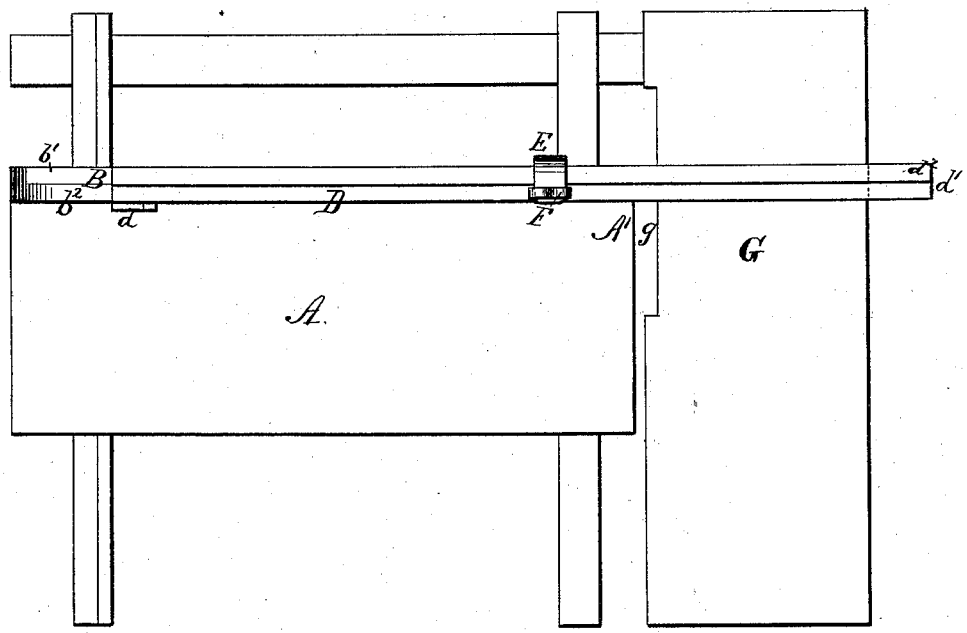
Figure 2:
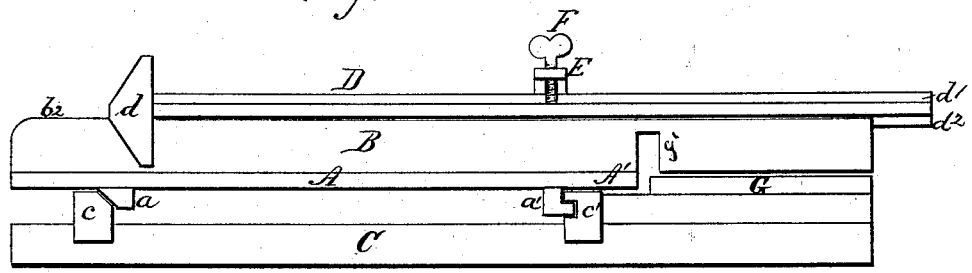

Figure 1 is a plan view; Fig. 2, a vertical cross-section.

The invention relates to novel means for gaging the division lengths of lumber on the sawing-machine patented to me May 26, 1874, and in securing the table on which lumber is fed, so as to take up its own wear and prevent the possibility of tilting.

The invention will first be fully described in connection with all that is necessary to a full understanding thereof, and then pointed out in the claims.

A represents the table, on which the lumber is held against the fast guide B. To the bottom of the table A I affix the ways $a$ $a'$, the former beveled on the outside, and the latter having an outside flange, or being made L-shaped. The stationary ways $c$ $c'$ are fixed across the frame C, one having an inside bevel corresponding to that of the movable way $a$, while the latter has an inside groove that receives the flange or side tongue of movable way $a'$. As the contacting surfaces of the ways become worn by rubbing friction, and fall slightly, the bevels on ways $a$ $c$ enable them still to make a close joint, and prevent the rattling which is so common in this class of saw-mills, while the side tongue and groove in ways $a'$ $c'$ prevent the table from tilting. D is a gage, which is provided with an end stop, $d$, and has groove and tenon $d^1$ $d^2$ on both sides, thus enabling it to be reversed, and yet slide readily on a corresponding groove and tenon, $b^1$ $b^2$, on the guide B. E is a plate fastened to outside of guide B, and end turned over its edge, the end being holed and threaded to form a nut, $b$, for the clamp-screw F. G is a stationary board or plate, which has a slot, $g$, that, in conjunction with the vertical slot $g'$ of the guide, allows a space for the free movement of the crosscut-saw. The gage is first clamped, and the lumber placed upon the table A; then pushed until one end strikes the stop $d$ of gage D, and finally fed gradually forward to the saw upon the ways. The distance from the edge A' to the stop $d$ of gage D measures each length into which the lumber is to be cut, and of course may, by the adjustability of gage D, be graduated to any desired measure. After the whole has been divided into as many lengths as previously determined, one end of the outer cuts may remain uneven. In order to even this, the gage D is reversed, and the length pushed with its square end up against the stop $d$, bringing the unequal end beneath the saw, so as to allow its excision. These improvements are found in practice greatly to facilitate the operation of cross-cutting lumber, and very materially to economize the labor.

Having thus described my invention, what I claim as new is—

1. A sliding table provided with beveled way $a$ and L-shaped way $a'$, in combination with correspondingly constructed way $c$ $c'$, as and for the purpose described.

2. The gage D, having end stop $d$, and tongues upon each side, in combination with grooved guide B, as and for the purpose specified.

OLE T. GRONNER.

Witnesses:
 H. C. SMYSER,
 A. M. AITKEN.